United States Patent
DeLuca et al.

(10) Patent No.: US 11,263,337 B2
(45) Date of Patent: Mar. 1, 2022

(54) CONTINUOUS ENGINEERING MIGRATION OF DIGITAL TWIN FILES FROM PRIVATE TO OPEN SOURCED

(71) Applicant: International Business Machines Corporation, Armonk, NY (US)

(72) Inventors: Lisa Seacat DeLuca, Baltimore, MD (US); Joseph G. Berti, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/787,200

(22) Filed: Feb. 11, 2020

(65) Prior Publication Data

US 2021/0248251 A1    Aug. 12, 2021

(51) Int. Cl.
| | | |
|---|---|---|
| G06F 21/00 | (2013.01) | |
| G06F 21/62 | (2013.01) | |
| G06F 16/14 | (2019.01) | |
| G06F 21/71 | (2013.01) | |
| G06F 21/31 | (2013.01) | |

(52) U.S. Cl.
CPC ........ *G06F 21/6218* (2013.01); *G06F 16/156* (2019.01); *G06F 21/31* (2013.01); *G06F 21/71* (2013.01)

(58) Field of Classification Search
CPC ...... G06F 21/6218; G06F 21/31; G06F 21/71; G06F 16/156
See application file for complete search history.

(56) References Cited

U.S. PATENT DOCUMENTS

| | | | |
|---|---|---|---|
| 8,260,736 B1 | 9/2012 | Lear et al. | |
| 9,830,194 B2 | 11/2017 | Neft | |
| 2016/0247129 A1 | 8/2016 | Song et al. | |
| 2017/0186058 A1 | 6/2017 | Hare et al. | |
| 2020/0295936 A1* | 9/2020 | Covaci | H04L 9/0891 |
| 2021/0110004 A1* | 4/2021 | Ross | H04L 63/10 |

FOREIGN PATENT DOCUMENTS

| | | |
|---|---|---|
| CN | 109116751 A | 1/2019 |
| CN | 109828780 A | 5/2019 |
| WO | 2018177568 A1 | 10/2018 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Edward Zee
*Assistant Examiner* — Chi D Nguy
(74) *Attorney, Agent, or Firm* — Mark Bergner (57) ABSTRACT

A computer-implemented system and method for searching comprises handling a digital twin (DT) component corresponding to a physical component. The DT component comprises an access attribute (DTAA) that controls access to the DT component, and other attributes of the DT component. The method further comprises responsive to a trigger, determining a factor value based on a plurality of factors associated with the DT. Responsive to the factor value exceeding a factor value threshold, the method comprises modifying the DTAA to permit access to the DT by a user not previously having access.

16 Claims, 6 Drawing Sheets

CONTINUOUS ENGINEERING MIGRATION OF DIGITAL TWIN FILES FROM PRIVATE TO OPEN SOURCED

BACKGROUND

Disclosed herein is a system and related method for transitioning digital twins and/or their respective components and attributes, from private to open source, depending on an analysis of various related factors. Historically, digital twin information has been protected by its owner to prevent others from using this data to make unauthorized copies or use this information inappropriately. In some instances, however, the digital twin information has been over-protected to the detriment of the digital twin owner.

SUMMARY

According to one aspect disclosed herein, a computer-implemented method is provided comprising using one or more processors for providing, in a memory associated with the one or more processors, a digital twin (DT) component corresponding to a physical component. The DT component comprises an access attribute (DTAA) that controls access to the DT component, and other attributes of the DT component. The method further comprises responsive to a trigger, determining a factor value based on a plurality of factors associated with the DT. Responsive to the factor value exceeding a factor value threshold, the method comprises modifying the DTAA to permit access to the DT by a user not previously having access.

According to another aspect disclosed herein, a digital twin system is provided comprising a memory and a processor associated with the memory. The processor is configured to provide, in the memory associated with the one or more processors, a DT component corresponding to a physical component. The DT component comprises a DTAA that controls access to the DT component, and other attributes of the DT component. The processor is further configured to, responsive to a trigger, determine a factor value based on a plurality of factors associated with the DT. Responsive to the factor value exceeding a factor value threshold, the processor is further configured to modify the DTAA to permit access to the DT by a user not previously having access.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

A DT system may comprise information of DTs that may correspond to physical parts/assemblies. Historically, maintaining the DT information in private has been typically done to prevent theft and unauthorized access of intellectual property. However, based on benefits recognized in the Open Source software community, it has been recognized that such benefits may apply in the DT world as well. One must exercise care in placing some or all of a DT as Open Source, and thus, a number of factors should be taken into account before such an action is undertaken.

The following acronyms may be used below:
AA access attribute
API application program interface
ARM advanced RISC machine
CD-ROM compact disc ROM
CMS content management system
CoD capacity on demand
CPU central processing unit
CUoD capacity upgrade on demand
DPS data processing system
DT digital twin
DTAA digital twin access attribute
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
OS Open Source
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
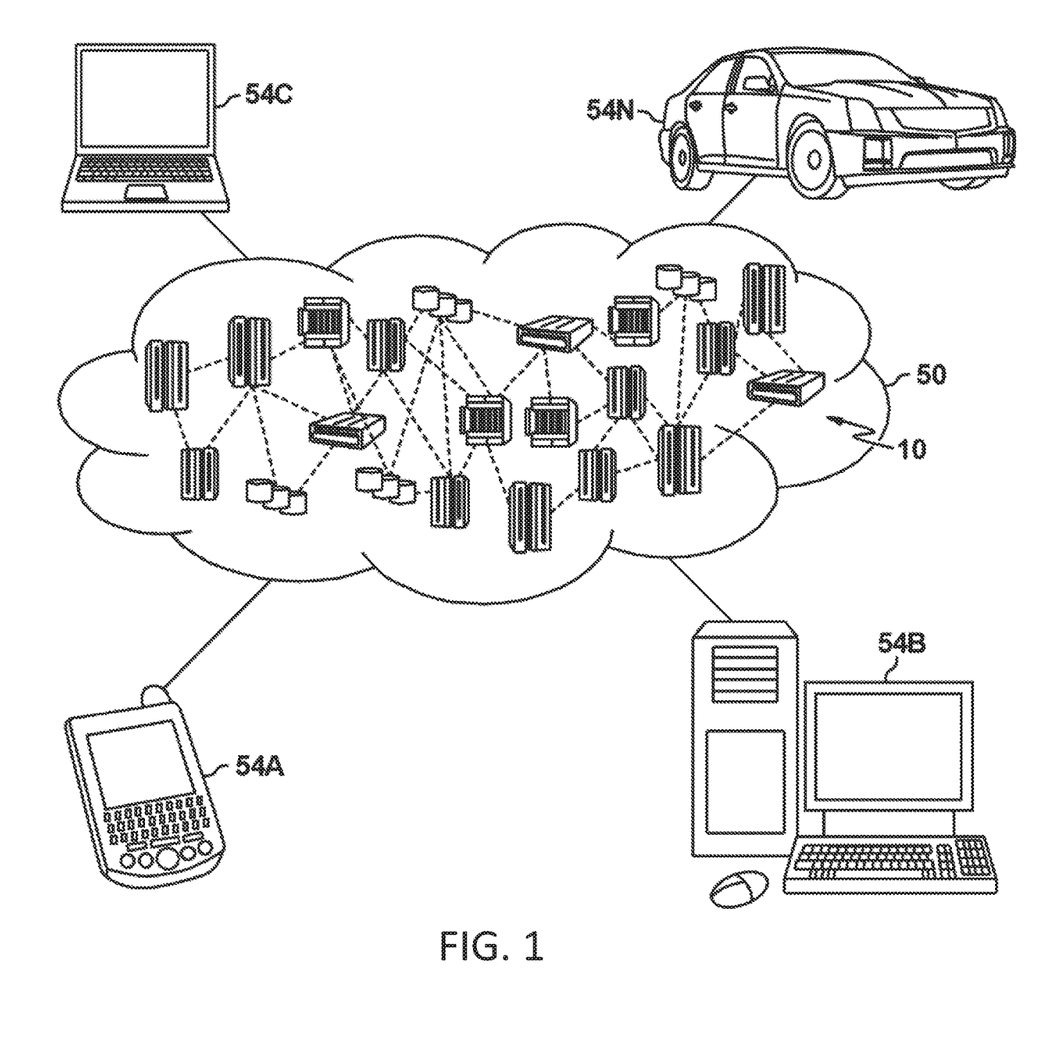
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
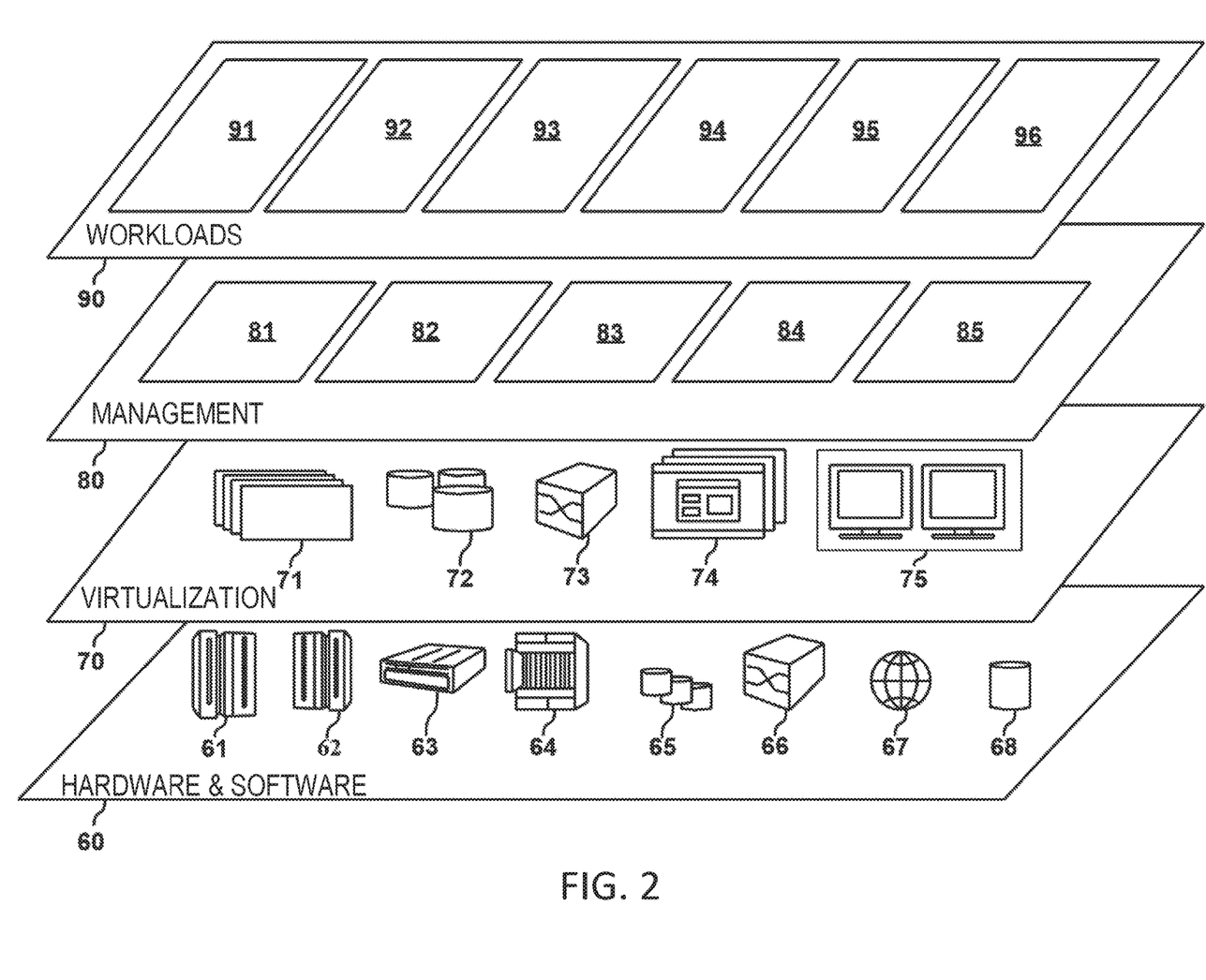
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
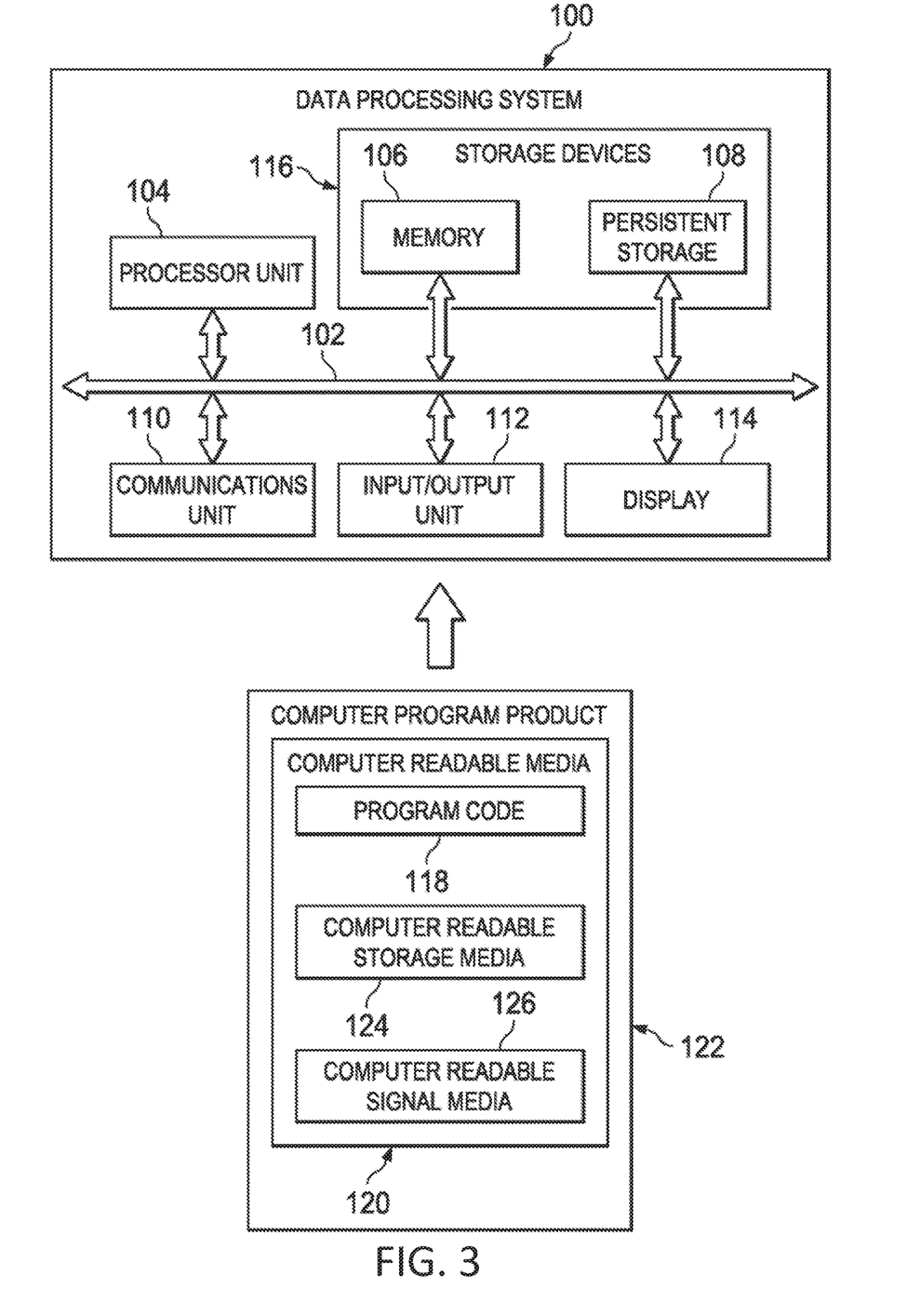
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Digital Twin (DT)

A digital twin (DT) is a digital representation of a physical thing (asset, building, vehicle, equipment, part, person, etc.). It may comprise spatial and dimensional information, materials, assembly instructions, constituent components, source/supplier information, manufacturer information, ownership information, and any other descriptive data (metadata) associated with a part, component, sub-assembly, assembly, etc. The DT model is designed to be an exact replicate of the physical object, and may contain information that makes it act, in a simulation, as its corresponding physical object. Thus, the DT model may be an exact replica of the physical working model, and it may be used to simulate an exact situation, and produce a result as it is done by the physical twin.

Often times, a DT may be made up of smaller or lower-level DTs—for example, an engine within a car might have its own separate DT apart from the car itself. The car may be made of multiple assemblies, and each assembly may be made of multiple sub-assemblies, etc., in a tiered or tree structure down to the component level. Each tier/level assembly or component may have its own DT.

The DT may describe a class of a thing—for example, a 4" padlock that utilizes a flat key, and a series of pins within the padlock that interact with a series of peaks and valleys of the flat key that permit it to be opened. Such general information may be shared among users and non-users alike without compromising the padlock itself. However, the DT may also describe specific instances within the class—i.e., a specific padlock. This instance inherits the general characteristics of this particular class of padlock, but it may also comprise information specific to this instance, such as the length of the pins and their arrangement, and/or the specific shape of the peaks and valleys of the key. Making such information publicly available for a specific instance of the padlock or key would compromise its usability, and therefore should not be publicly available.

Another example may be illustrated by a bolt. A DT of a class of bolt may comprise shareable descriptive information, such as the threads-per-inch, diameter, length, and shearing load. However, the specific metal composition to obtain the shearing load may be considered a trade secret and thus it is desirable not to share this aspect of the DT. The specifications and/or metadata contained within the DT(s) that are descriptive of such a physical thing may be proprietary or confidential, and considered non-public. In this case, it is desirable that various aspects of the design/specification/metadata do not fall into the wrong hands to permit unauthorized entities to reproduce the asset.

In another example, a 3-D rendering or other shape-related information of a component may be utilized to duplicate such a component. However, there are parts, assets, or sub-components/assemblies that are so common that confidentiality is not a concern. In the example of a complex mechanical part, such as a truck, various fasteners, basic mechanical structures, and the like, may not have confidential aspects to them. DTs for such components may be beneficially shared with others.

It may thus be beneficial to determine when a DT or its respective components/sub-assemblies should be made available to the public, based on a variety of factors, according to an access attribute. The concept of open sourcing is one that may be utilized for making the DTs available to the public. Although open sourcing has its roots in the software arena, the general concepts of open sourcing have been applied to other areas as well. The open source (OS) model encourages open collaboration in a decentralized development model to coordinate participants who may interact to create a product or service (which may be made available to contributors and non-contributors alike)—open sourcing encourages interaction and exchange of information, and under certain conditions, the benefits of open sourcing something outweigh the drawbacks. In some embodiments disclosed herein, once a particular part or certain data associated with the part is determined to be suitable for open sourcing, based on a number of factors, this information may then be made available to the public and, in some embodiments, placed in an OS repository that stores the DT part or asset. This may be provided along with a unique digital id to reference the asset's DT in the repository.

Figure 4:
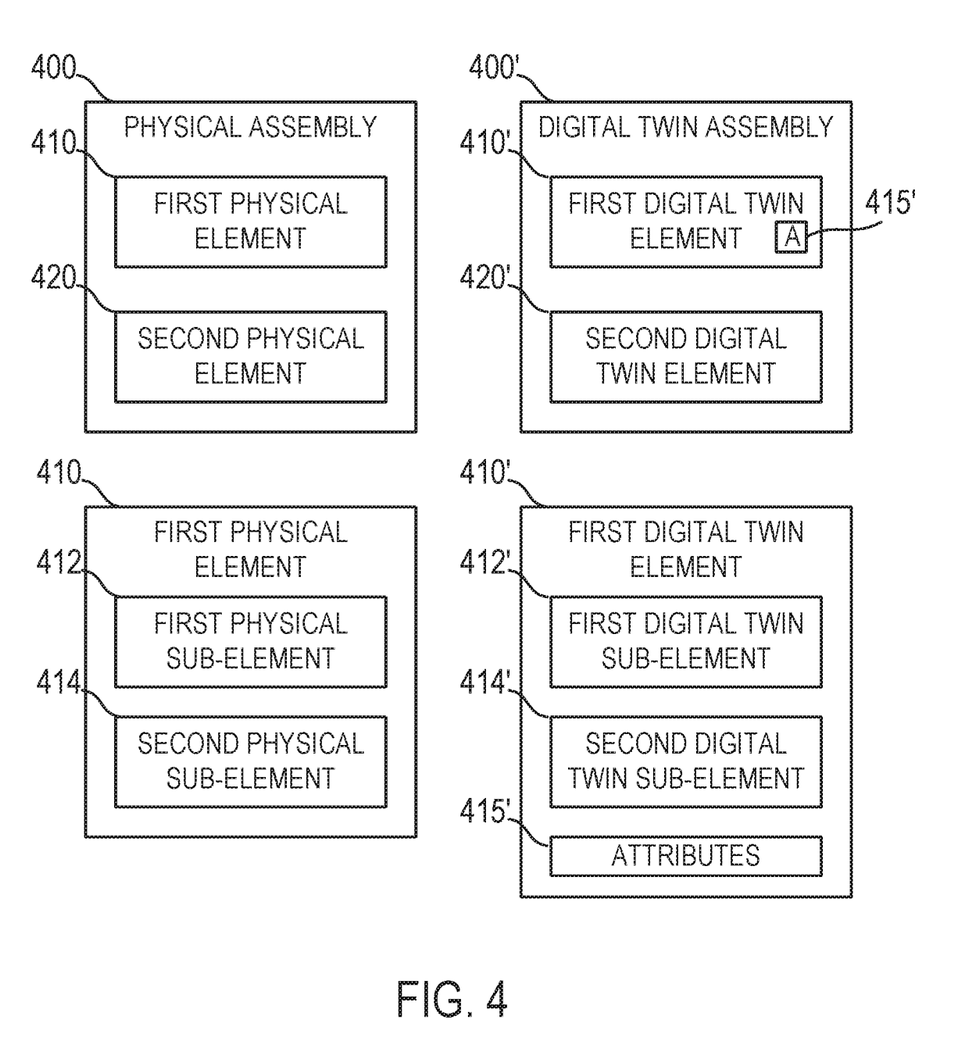
FIG. 4 is a block diagram that illustrates a relationship between a physical assembly and a digital twin assembly.

FIG. 4 is an example block diagram illustrating the correspondence between a physical assembly 400 and its corresponding digital twin assembly 400' that may be stored in a memory of a DPS such as, for example, the DPS 100 as described above. As an illustrative example, a truck may correspond to the physical assembly 400 and this truck may comprise a first gear assembly as the first physical element 410 and a second gear assembly as the second physical element 420. The first physical element 410 may comprise a first physical sub-element 412 and a second physical sub-element 414. In the illustrative example, the first physical sub-element 412 may be the actual gear itself, and the second physical sub-element 414 may be a mounting screw for affixing the gear to a shaft.

The physical assembly 400 may have an associated DT assembly 400' comprising information of digital representations of and related to the physical assembly 400. The DT assembly 400' may have data structures corresponding to the related physical entities. As shown in FIG. 4, the first DT element 410' (also referred to herein as a DT component) comprises information representing/related to the first physical element 410, and the second DT element 420' comprises information representing/related to the second physical element 420. Just as the first physical element 410 may be broken down into first and second physical sub-elements 412, 414, so too can the first DT element 410' be broken down into a first DT sub-element 412' and a second DT sub-element 414'. When an element is comprised of sub-elements, the element, such as the first DT element 410' may additionally comprise information about how the first DT sub-element 412' and the second DT sub-element 414' are assembled (e.g., assembly instructions) or combined (e.g., spatial relationships) in order to produce the first DT element 410'.

Each element of a DT may be provided with various attributes 415' that each may have a value. One such attribute may be a unique identifier, such as a universally unique identifier (UUID) or globally unique identifier (GUID) that are generated in specified ways such that the probability of creating a duplicate is negligible. If a sub-component making up a component changes, then the UUID of the component may change as well, since it is technically a different component. Various additional attributes may be defined for the DTs, and sets of attributes may vary, depending on the element. For example, dimension attributes (diameter, thickness), materials (carbon-steel), teeth configuration (50-tooth gear) may be defined for the first physical sub-element 412 that is the gear. One attribute, discussed in more detail below, may be an access attribute that provides access information as to who has what type of access to various attributes associated with the DT elements. The type of access may include read, write, create, delete, and other forms of access that those of skill in the art with data access control would understand. The "who" having access may be defined as individuals, groups, etc., and may be based on an authenticated user wishing to have various types of access to the information contained within the DTs. In various embodiments discussed herein, the access attribute for a given DT (or an access attribute for an attribute of the DT) may be "private" and "OS".

The DT for a given entity may be created by that entity's manufacturer or supplier and may include DTs for assemblies, sub-assemblies, components, and various combinations of these. DTs for sub-assemblies and components that the entity's manufacturer or supplier did not create or copy may be linked to, if links to the sub-assemblies and components are available. The creator of the DT may create and assign a UUID for the DT and store the information in a database of a DT system. In addition to the DT having a UUID, and each of the DT's sub components having their own UUID, all or some of the attributes of the DTs and sub components may have their own UUID as well, and may have their own access attribute. Thus, the material composition of the gear may have its own UUID and access attribute independent of those for the DT of the gear itself. This arrangement may permit the composition of the gear to be protected, while its holding strength and other performance characteristics to be OS and available to anyone. In some embodiments, a new version of a product may be assigned a new UUID and treated as a new physical part requiring a new DT. A factor-based analysis as described herein as being performed on the DT as a whole may also be performed on any attribute of the DT as well.

Figure 5:
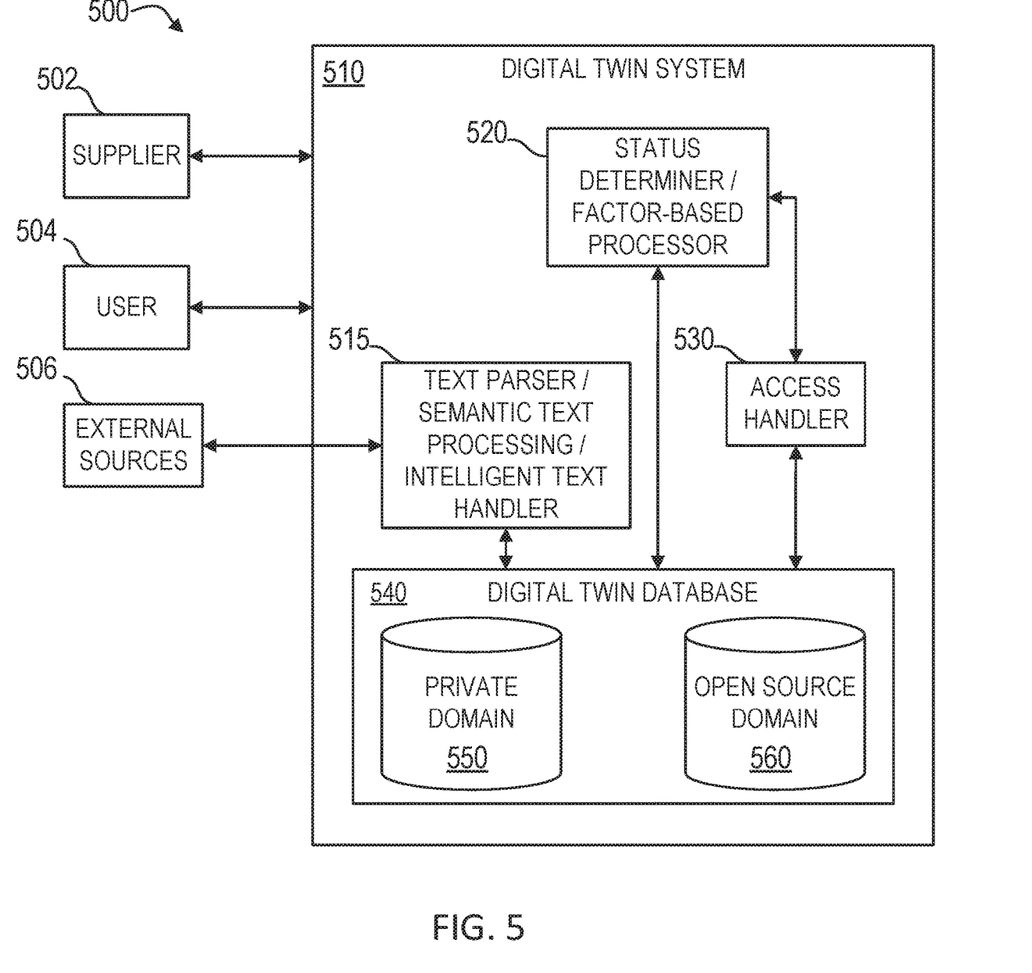
FIG. 5 is a block diagram of one or more embodiments of the digital twin system server, according to some embodiments.

FIG. 5 is a block diagram of a DT system 510 that may interface with a supplier device 502 and a user (or consumer) device 504. The DT system 510 may comprise, e.g., a server or other DPS 100. A status determiner 520 may determine whether a protected DT entity is to be moved from a protected private domain 550 to an OS domain 560 in a DT database 540. In some embodiments, by default or in an initial state, a DT of a physical entity may be presumed to be private or protected by the entity's creator. A status determiner 520, for example, a factor-based processor that utilized some form of, e.g., a weighted factor analysis, may assess the DT entity based on various factors to determine if the status of the DT entity should be changed, for example, from private to OS, and determine whether a particular factor, along with its weighting, weighs in favor of or against switching the DT entity, or any part thereof, from private to OS. As noted above, a more complex form of protection besides just private and OS may be produced as an end result of the status determiner 520. It may be beneficial, given a large amount of information that may comprise a high-level DT, that as many factors as possible be considered in an automated manner—in which case automated access to available information and automated intelligent processing may be important.

In some embodiments, once the status of the DT entity is changed to OS, it cannot be changed back to private, and thus, a determination to make this change is important. A physical entity manufacturer may benefit from providing the DT entity information in the OS domain 560 in that it may encourage others to use that particular physical entity in other assemblies. Conversely, a physical entity manufacturer may be harmed by providing the DT entity information in the OS domain 560 if there is a likelihood that freeloaders would be able to easily replicate the physical entity from the DT entity information without having research and development costs associated with the physical entity to recoup.

Although the data making up a DT assembly 400' may reside in a common location or database, such as the DT database 540 on a common DT system 510, it is possible that the constituent elements may be located in different places and have different control mechanisms in place. This is particularly true when, e.g., two different components are sourced from different third parties. In such a case, a third party for a gear may maintain their own DT for the gear and control its access. The DT for the gear may be copied or a link may be provided for access. Such links may be utilized to link to constituent sub-components of various DT entities. For example, the truck manufacturer may have the actual DT data associated with the truck entity stored in a data server that is owned, managed, and/or housed with the truck manufacturer. However, the first gear manufacturer may have the actual DT data associated with the first gear stored in a data server that is owned, managed, and/or housed with the first gear manufacturer. The truck entity DT may have a link to the first gear entity DT in some embodiments, instead of having the actual data of the first gear entity DT, as in other embodiments. In such a situation, the owner of the truck DT may not have the authority to OS the gear, despite the fact that the owner of the truck DT may receive requests to OS the gear. In this situation, the truck DT owner may send a request to the gear DT owner, asking if the gear DT owner would be willing to OS the gear DT.

Factor-Based Analysis/Processor 520

The various factors taken into account by the status determiner 520 may include any or all of the following factors. A first factor may be the cost or value of the physical entity itself. A high-value of the physical entity, such as a truck costing over $5,000,000, may weigh in favor of keeping the DT entity in the private domain 550, where restricting access may prevent others from easily replicating the physical entity. Alternately, a low-value of the physical entity, such as a mounting screw for a truck gear costing $5, may weigh in favor of creating or transitioning the DT entity to the OS domain 560. Investing a significant amount of money in research and/or development may suggest a greater preference for keeping a DT private. The costs may be specified in terms of actual monetary units or in terms of resources needed for production (materials, manhours, etc.) In some embodiments, research and development costs as well as manufacturing costs may be determined by automatically obtaining accounting records, such as work orders, invoices, and the like, from a database, and then subjecting these records to an automated analysis of costs related to the physical entity.

A second factor may be a physical size of the physical entity. Smaller entities may be suggestive of less complex, simpler entities, whereas larger entities may be suggestive of complex entities. An advantage of using physical size is that a determination of physical size may be automatically created based on existing geometric information that may be associated with the physical entity. For example, 3D modeling data may be created during the design process that may be accessed, and a physical volume may already exist or be easily calculated on the processor. Physical size may be expressed in any size or volume measurement units.

A third factor may be the complexity of the physical entity, i.e., a number of parts and/or number of interrelationships with those parts. A wristwatch is much physically smaller than a blacksmith's anvil, but far more complex. The system may be able to traverse the hierarchical tree associated with an entity in order to determine a number of constituent parts. This may be possible even when all information for the constituent parts is not available. By way of example, a size value and a complexity value may be calculated by semantic analysis and text extraction of manuals, or other forms of documentation, describing the part when certain key/values or answers are not available within a database system.

A fourth factor may be the number of and/or size of competitors who create similar products. Having a greater the number of competitors for the physical entity may weigh against switching the DT entity to OS. Similarly, a size of the competitor, or a size of the competitor for that particular physical entity may be utilized. Having a larger competitor may similarly weigh against switching the DT entity to OS. Such information about competitors may be obtained from external sources, such as news feeds, government databases, and the like. Competitor size may be measured in a number of ways, such as annual revenue, number of employees, amount of a particular product produced by the competitor, and the like.

A fifth factor may be a likelihood or ease of duplication. If the likelihood of duplication is low due to various factors, such as the cost of materials that go into the physical entity, special equipment needed to produce the physical entity, know-how required to make the part, and the like, this may weigh in favor of switching the DT entity to OS. Related to this is the consideration, in a situation where a DT entity has only part of its information as OS, as to which information permits easy duplication vs which information does not. A ½"×2 in. bolt having a 1000 lb. shearing strength may have these characteristics being OS, whereas the material composition of the bolt may be kept private. This delineation permits others to understand valuable characteristics of a subcomponent that may be used in a larger assembly without giving away key information as to how to duplicate the physical entity. A determination may be made as to which attributes are more likely to permit easy replication of the physical entity based on them being easier to determine by others. For example, the shearing force of a bolt may be fairly easily determinable by a competitor by applying a known shearing force to the bolt—whereas the material composition of the bolt may be much or difficult to determine and require expensive laboratory equipment.

A sixth factor may be based on a number of requests for access to a particular DT entity in combination with factors related to the request. By way of example, if there are daily requests from hundreds of users to get access to the DT entity, then it may be a common part. If the request for access is granted 100% of the time, this may weigh in favor of switching the DT entity to OS. Conversely, if the request for access is granted only 10% of the time, this may weigh in favor of leaving the DT entity private. Historical access records may be scanned to assess a frequency with which requests are made and also the proportion of requests that are granted. A variable that may be taken into account is who is making the request for a DT entity. If the requests are primarily made by purchasers of physical entities, there may be a greater likelihood that the requester is unlikely to replicate the part and this may weigh in favor of switching the DT entity to OS. In contrast, if the requests are primarily made by non-purchasing competitors, then this may weigh in favor of leaving the DT entity as being private.

A seventh factor may be based on an assessment of the physical entity's intellectual property (IP) value (IPV). A physical entity having a greater IPV, related to the first factor (the first and seventh factor may be analyzed together) may weigh against switching the DT entity to OS, since greater effort and expense has been made to protect it. In some implementations, however, a physical entity that has ample IP protection, such as issued patents, in place may consider that there is less risk of replicating the physical entity by others, and hence this may weigh in favor of switching the DT entity to OS. However, in some implementations, since a patent is only in force during its limited life, the fact that the patent will ultimately expire may weigh against switching the DT entity to OS. In other implementations, switching the DT entity to OS may take place only after the patent expires. Other related patent factors may be considered, such as a number of patent applications applied for but that were never granted, the status of the patent (e.g., pending, issued, expired, application abandoned, pending or potential litigation, etc.). Relevant information may be obtained from a company's internal IP database and/or an external IP database, such as the U.S. Patent & Trademark Office patent databases.

An eighth factor may be similar to the seventh factor except that it considers other DTs having a relationship with the DT (e.g., children DTs and/or parent DTs) and their constituent IP assessment may be done on the whole of the asset or on an individual component basis. It may be possible, in this scenario, for the status determiner 520 to drill down into some or all constituent DT components in order perform a complete assessment. Additionally, when a business controls all or a large percentage of the parent DT entities in which a child DT entity is used, a value could be determined based on the number (or criticality, or other factors) of the child DT entity.

Various weightings may be applied to each of the factors to determine if a threshold value $V_{th}$ has been exceeded for transitioning the status of the DT, e.g., from a private state to an OS state. Thus, the DT value $V_{DT}$ may be represented as:

$$V_{DT}=w_1 f_1(\ )+\ldots w_n f_n(\ );$$

where w is a weighting applied to each factor f( ); and n is the number of factors.

If the status determiner 520 determines that the DT value is above the threshold value ($V_{DT}>V_{th}$), then the status determiner 520 may indicate that the DT is considered to have a high value, and the DT may remain in the private domain 550. Conversely, if the status determiner 520 determines that the DT value is at or below the threshold value ($V_{DT} \leq V_{th}$), then the status determiner 520 may indicate that the DT is considered to have a low value, then the DT may be transitioned from the private domain 550 to the OS domain 560 by an access handler 530 whose responsibility it is to properly transition the DT to the OS domain 560. Such an analysis may be performed with respect to the DT as a whole or any one of the DT's attributes. In some embodiments, this decision may be automatically made. In some embodiments, this information may be presented to a user to make a final decision as to whether to leave the DT private or transition it to OS. Such an automated or manual decision may be made with respect to any part of the DT's attributes. By way of example, it may be determined that a DT's marketing materials may be transitioned to OS, whereas the DT's CAD drawings or digital 3-D models are to be kept private, due to a potential competitor using the 3-D model attributes of the DT to easily copy the physical part represented by the DT. A manual or automated trigger (timer-based, event-based) may allow the DT and/or constituent component(s) to be re-analyzed.

Information for a DT as well as information utilized by the various factors described above may be obtained from external sources 506 (these external sources may include suppliers 502 as well), via, e.g., a network or other device, such as a storage device, etc. Since much of the information obtained may be in a textual format, an intelligent text handler 515 (also called a text parser or semantic text processing) may be utilized to convert received text into information that is more meaningful to the computer. For example, text-based dimensions may be parsed into 3D models of various component parts. Text may also be parsed to determine inter-relationships between parts, material compositions, manufacturers/suppliers, etc.

The following use case may illustrate a basic implementation of the system discussed above. Sam works for MineCo, a mining company, and has helped to capture information that is now part of the DT for one of their underground mining trucks (item #1 in Table 1). For the sake of clarity, the truck, item #1 in the Tables, may correspond to the DT assembly 400', Part A may correspond to the first digital twin element 410', and Part B may correspond to the second digital twin element 420. The master or parent DT for the mining truck is made up of the entirety of the asset. However, there are multiple sub-DTs (items #2, #3) that make up the parent #1: There is a DT for Part A—the first gear, and a DT for Part B—the second gear (in the example, there are other parts that make up the truck). The reason for dividing the whole into parts (i.e., multiple DTs) is that some of these parts may be reused in other equipment that MineCo manufacturers, and so certain parts (and their related DT's content) should be shareable. In the Example, Part A is a gear used in other trucks, and therefore, it may be assessed as to whether it should be made sharable as an OS part. Initially, all of the DT components are private, as shown in Table 1.

Over time, Sam receives multiple third-party requests from users or retailers of its trucks to share CAD drawings and user manuals for Part A, which is a cheap gear to create, costing only $15. The multiple third-party requests are due to the fact that these third parties want to be able to 3D print Part A in house. Sam and his company often agree to share information because it makes their third-party partners happy and, in the case of Part A, information about the part is not critical to the production of the truck. Taking all or some of the factors described above into consideration, the system analyzes each of the DTs making up the truck in the DT database 540. Since the DT for the truck itself is considered to have high value that exceeds the threshold, it remains as a private DT. However, because of the activity on the Part A first gear in combination with other factors based on the analysis, Part A is flagged to be OS. This decision may be made automatically, or it may utilize human intervention. In this instance, flagged parts may be presented to Sam on a display screen so that Sam may be the final decision-maker about OS-ing. Sam agrees that Part A should be OSd and the DT for Part A is transitioned from the protected domain 550 to the OS domain 560 in the DT database 540. Although Part B, a second gear, may be somewhat similar to Part A, the first gear, any of the factors used in the analysis could produce an end value indicating that it should remain private. As a result, the DT database 540 may appear as in Table 2 after the transition.

TABLE 1

DT Database Prior to Transition

| # | Description | Status |
|---|---|---|
| 1 | Truck | Private |
| 2 | Part A - First Gear | Private |
| 3 | Part B - Second Gear | Private |
| 4 | ... | ... |
| 5 | Sub Twin n | Private |

TABLE 2

DT Database After Transition

| # | Description | Private or OSd |
|---|---|---|
| 1 | Truck | Private |
| 2 | Part A - First Gear | OS |
| 3 | Part B - Second Gear | Private |
| 4 | ... | ... |
| 5 | Sub Twin n | Private |

Figure 6:
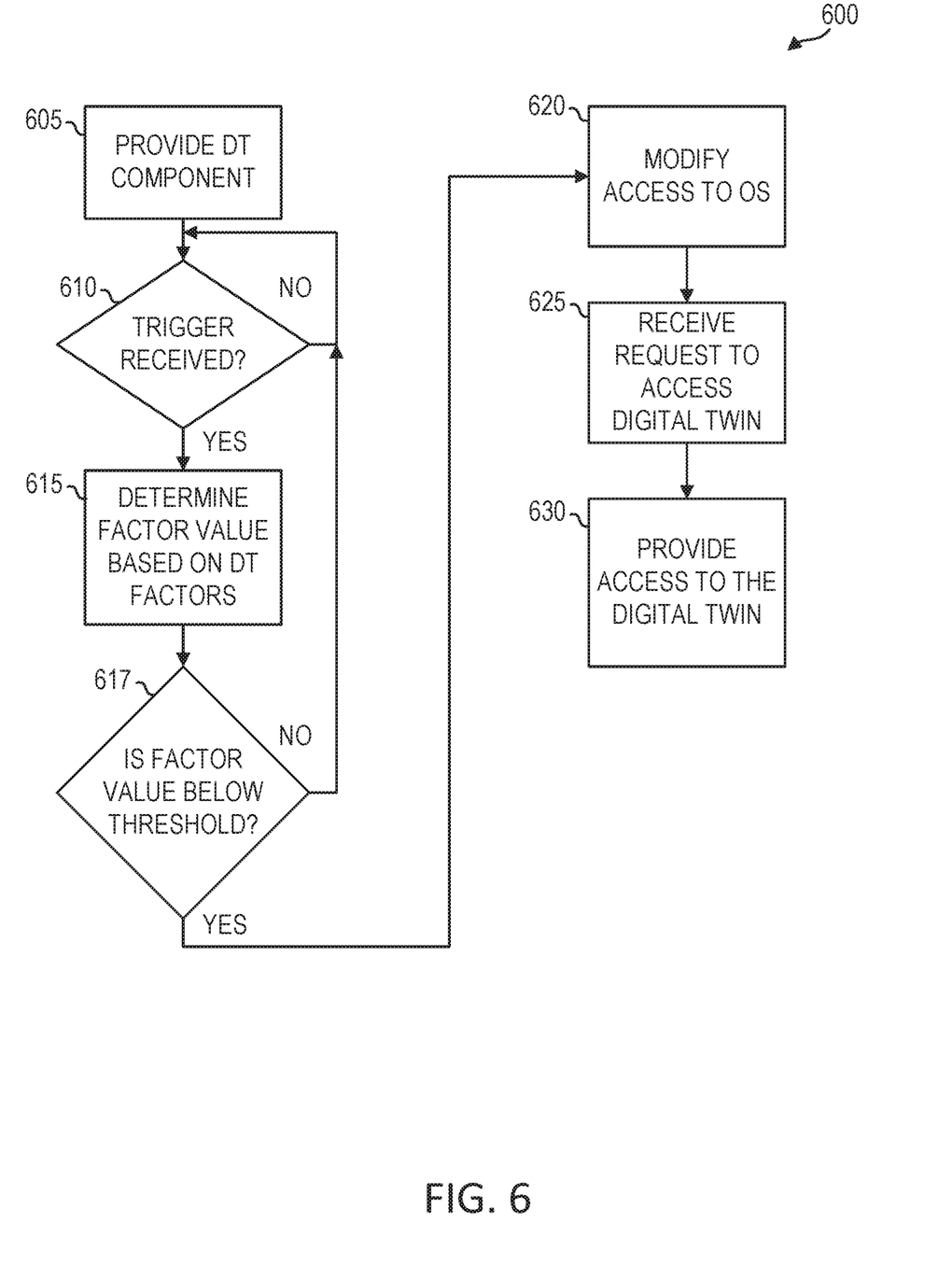
FIG. 6 is a flowchart of one or more embodiments of a process disclosed herein.

FIG. 6 is a flowchart of a process 600 for operating a DT system. In operation 605, a DT component or element 410' is created that represents a physical component. The DT component 410' may comprise a plurality of attributes 415' that may include an access attribute and a UUID, along with other possible attributes that describe the physical component that the DT component 410' is associated with. A check is made to see if a trigger is received 610. If not (610:N), then this component of the process waits for the trigger to occur. When the trigger occurs (610:Y), then in operation 615 a factor value is determined for the DT component 410' based on a plurality of DT factors, as described above.

In operation 617, a test is performed to see if the factor value falls below a threshold. If not (617:N), then the process loops back to operation 610 and waits for a trigger event. Otherwise (617:Y), the process performs, in operation 620, a modification to the access attribute. In some implementations, the modification is an irrevocable modification. In some implementations, this modification constitutes a transition from private access to OS access. In some implementations, such a transition constitutes changing the access attribute, and in some implementations, this transition constitutes moving the DT from a private domain 550 into an open source domain 560 within the digital twin database 540.

In operation 625, a request for access to the DT is received from a user who doesn't currently or did not used to have access to the DT. Such a request may be a triggering event for operation 610 if the DT is set for private access. However, if the access attribute of the DT is set for OS, or some other access state allowing access by the user, in operation 630, access to the DT is provided by the system to the user. This may be done by using protection mechanisms built into the database in which the digital twin database 540 resides, or those built into the operating system or platform within which the digital twin system 510 is run. As noted above, different attributes of the DT may have different levels of access, and different attributes may be protected in different ways.

As noted above, although the system and methods described herein indicate a DT as having only two states (private and OS), the system may use a more complex security/protection mechanism with different levels of authorization and individuals/groups/systems having access to different levels of authorization. Various mechanisms for access control, such as those applied to protect files within a multi-user system may be applied to DT components, along with analyses using various factors and thresholding, as described above.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising using one or more processors for:
providing, in a memory associated with the one or more processors, a digital twin (DT) component corresponding to a physical component, the DT component comprising:
an access attribute (DTAA) that controls access to the DT component; and
other attributes of the DT component;
the method further comprising:
responsive to a trigger, determining a factor value based on a plurality of factors associated with the DT; and
responsive to the factor value exceeding a factor value threshold, modifying the DTAA to permit access to the DT by a user not previously having access;
wherein the plurality of factors are selected from the group consisting of: manufacturing cost, physical characteristic of a product or asset related to the DT component, characteristics of competing manufacturers of the product or asset, ease of reproduction of the product or asset, number of requests for access to the component or subcomponents, identity of a requester for access to the component or subcomponents, and calculated value of other related components including child components and parent components.

2. The method of claim 1, wherein:
the DTAA comprises two states: private, and open source (OS); and
the modifying comprises changing the DTAA from private to OS.

3. The method of claim 1, wherein the trigger is the request by the user for access to the DT.

4. The method of claim 1, further comprising:
receiving a request by the user for access to the DT; and
responsive to receiving the request by the user and the DTAA indicating the user has access to the DT, providing access to the DT for the user.

5. The method of claim 1, further comprising prior to the modification of the DTAA to permit access to the DT, receiving an approval by an administrator.

6. The method of claim 1, wherein the plurality of factors include manufacturing cost, physical characteristic of the product or asset, characteristics of competing manufacturers of the product or asset, ease of reproduction of the product or asset, number of requests for access to the component or subcomponents, identity of a requester for access to the component or subcomponents, status or activity of patent filings related to the product or asset, and calculated value of other related components including child components and parent components.

7. The method of claim 1, wherein the determining of the factor value comprises performing a weighted factor analysis in which each of the factors is weighted with its own weight.

8. The method of claim 1, wherein:
the DT comprises a DT sub-component (DTSC) that corresponds to a physical sub-component of the physical component; and
the determining of the factor value for the DT comprises determining the factor value for the DT sub-component.

9. The method of claim 8, wherein:
the DTSC is located remote from the DT but is accessible via a network, and a link to the DTSC is provided within the DT.

10. The method of claim 8, wherein a third-party controls an access attribute of the DTSC.

11. The method of claim 1, wherein the modification to the DTAA further comprises moving the DT from a private domain of a DT database to an OS domain of the DT database.

12. A digital twin system, comprising:
a memory and a processor associated with the memory, the processor configured to:
provide, in the memory associated with the one or more processors, a digital twin (DT) component corresponding to a physical component, the DT component comprising:
an access attribute (DTAA) that controls access to the DT component; and
other attributes of the DT component;
the processor further configured to:
responsive to a trigger, determine a factor value based on a plurality of factors associated with the DT; and
responsive to the factor value exceeding a factor value threshold, modify the DTAA to permit access to the DT by a user not previously having access;
wherein the plurality of factors are selected from the group consisting of:
manufacturing cost, physical characteristic of a product or asset related to the DT component, characteristics of competing manufacturers of the product or asset, ease of reproduction of the product or asset, number of requests for access to the component or subcomponents, identity of a requester for access to the component or subcomponents, and calculated value of other related components including child components and parent components.

13. The system of claim 12, wherein:
the DTAA comprises two states: private, and open source (OS); and
the modifying comprises changing the DTAA from private to OS.

14. The system of claim 12, wherein the processor is further configured to:
receive a request by the user for access to the DT; and
responsive to receipt of the request by the user and the DTAA indicating the user has access to the DT, provide access to the DT for the user.

15. The system of claim 12, wherein the plurality of factors include manufacturing cost, physical characteristic of the product or asset, characteristics of competing manufacturers of the product or asset, ease of reproduction of the product or asset, number of requests for access to the component or subcomponents, identity of a requester for access to the component or subcomponents, status or activity of patent filings related to the product or asset, and calculated value of other related components including child components and parent components.

16. A computer-implemented method comprising using one or more processors for:
  providing, in a memory associated with the one or more processors, a digital twin (DT) component corresponding to a physical component, the DT component comprising:
    an access attribute (DTAA) that controls access to the DT component; and
    other attributes of the DT component;
the method further comprising:
  responsive to a trigger, determining a factor value based on a plurality of factors associated with the DT; and
  responsive to the factor value exceeding a factor value threshold, modifying the DTAA to permit access to the DT by a user not previously having access;
  wherein the modification to the DTAA is an irrevocable modification.

* * * * *